US010613787B2

(12) United States Patent
Yu et al.

(10) Patent No.: US 10,613,787 B2
(45) Date of Patent: Apr. 7, 2020

(54) TECHNIQUES FOR REBALANCING STORAGE BETWEEN SUBSPACES

(71) Applicant: EMC IP Holding Company LLC, Hopkinton, MA (US)

(72) Inventors: Piers Yu, Shanghai (CN); Banghui Luo, Shanghai (CN); Ruiling Dou, Shanghai (CN); Ahsan Rashid, Edison, NJ (US); Jun Liu, Shanghai (CN); Xianlong Liu, Shanghai (CN); Walter C. Forrester, Berkeley Heights, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 26 days.

(21) Appl. No.: 15/885,025

(22) Filed: Jan. 31, 2018

(65) Prior Publication Data
US 2019/0235782 A1 Aug. 1, 2019

(51) Int. Cl.
*G06F 3/06* (2006.01)
*G06F 12/02* (2006.01)

(52) U.S. Cl.
CPC .......... *G06F 3/0646* (2013.01); *G06F 3/0608* (2013.01); *G06F 3/0643* (2013.01); *G06F 12/023* (2013.01)

(58) Field of Classification Search
CPC .... G06F 3/0646; G06F 3/0608; G06F 3/0643; G06F 12/023
See application file for complete search history.

(56) References Cited

U.S. PATENT DOCUMENTS

| 8,566,371 | B1 * | 10/2013 | Bono | ........... G06F 16/119 707/822 |
| 9,152,353 | B1 | 10/2015 | Wang et al. | |
| 9,152,637 | B1 | 10/2015 | Forrester et al. | |
| 9,330,155 | B1 | 5/2016 | Bono et al. | |

(Continued)

OTHER PUBLICATIONS

Xianlong Liu, et al.; "Data Storage System Using In-Memory Structure for Reclaiming Space From Internal File System to Pool Storage," U.S. Appl. No. 15/797,323, filed Oct. 30, 2017.

(Continued)

*Primary Examiner* — Francisco A Grullon
(74) *Attorney, Agent, or Firm* — BainwoodHuang

(57) ABSTRACT

Techniques for improving storage efficiency of a data storage system are provided. The techniques include (a) performing a testing operation to evaluate whether a test condition is satisfied for a filesystem having a plurality of subspaces, each subspace being provisioned with a respective amount of storage, each subspace of the filesystem being dedicated to storing different respective types of filesystem content, wherein the test condition indicates that a first subspace has available space in excess of a threshold percentage, (b) in response to determining that the test condition is satisfied for the filesystem, performing a reduction operation on the first subspace to remove a portion of storage provisioned to that subspace while retaining the removed portion for use by the filesystem, and (c) upon a second subspace reaching a fullness threshold, provisioning the removed portion to the second subspace and storing content of the respective type of the second subspace thereon.

18 Claims, 5 Drawing Sheets

(56) References Cited

U.S. PATENT DOCUMENTS

| | | | |
|---|---|---|---|
| 9,355,121 B1 * | 5/2016 | Scheer | G06F 16/185 |
| 9,400,741 B1 * | 7/2016 | Bono | G06F 12/023 |
| 9,430,492 B1 | 8/2016 | Bono et al. | |
| 9,864,753 B1 | 1/2018 | Armangau et al. | |
| 9,880,743 B1 | 1/2018 | Armangau et al. | |
| 9,933,945 B1 | 4/2018 | Mao et al. | |
| 10,013,217 B1 | 7/2018 | Bono et al. | |

OTHER PUBLICATIONS

Changyong Yu, et al.; "Data Storge System Dynamically Re-Marking Slices for Reclamation From Internal File System to Pool Storage," U.S. Appl. No. 15/797,284, filed Oct. 30, 2017.

Changyong Yu, et al.; "Enforcing Minimum Space Guarantees in Thinly-Provisioned File Systems," U.S. Appl. No. 15/498,834, filed Apr. 27, 2017.

Ahsan Rashid, "Data Storage System Employing File Space Reclaim Without Data Movement," U.S. Appl. No. 15/085,282, filed Mar. 30, 2016.

Ivan Bassov, et al.; "Converting Files Between Thinly and Thickly Provisioned States," U.S. Appl. No. 15/197,071, filed Jun. 29, 2016.

Rohit Chawla, et al.; "Inline Coalescing of File System Free Space," U.S. Appl. No. 15/883,701, filed Jan. 30, 2018.

Gyanesh Kumar Choudhary, et al.; "Techniques for Efficiently Performing Filesystem Reorganization Tasks for Different Filesystems," U.S. Appl. No. 15/394,601, filed Dec. 29, 2016.

Ye Zhang, et al.; "Dense File Reservation in Thinly Provisioned File System," U.S. Appl. No. 14/501,522, filed Sep. 30, 2014.

David Haase, et al.; "Managing Multiple File System Expansions," U.S. Appl. No. 14/753,561, filed Jun. 29, 2015.

* cited by examiner

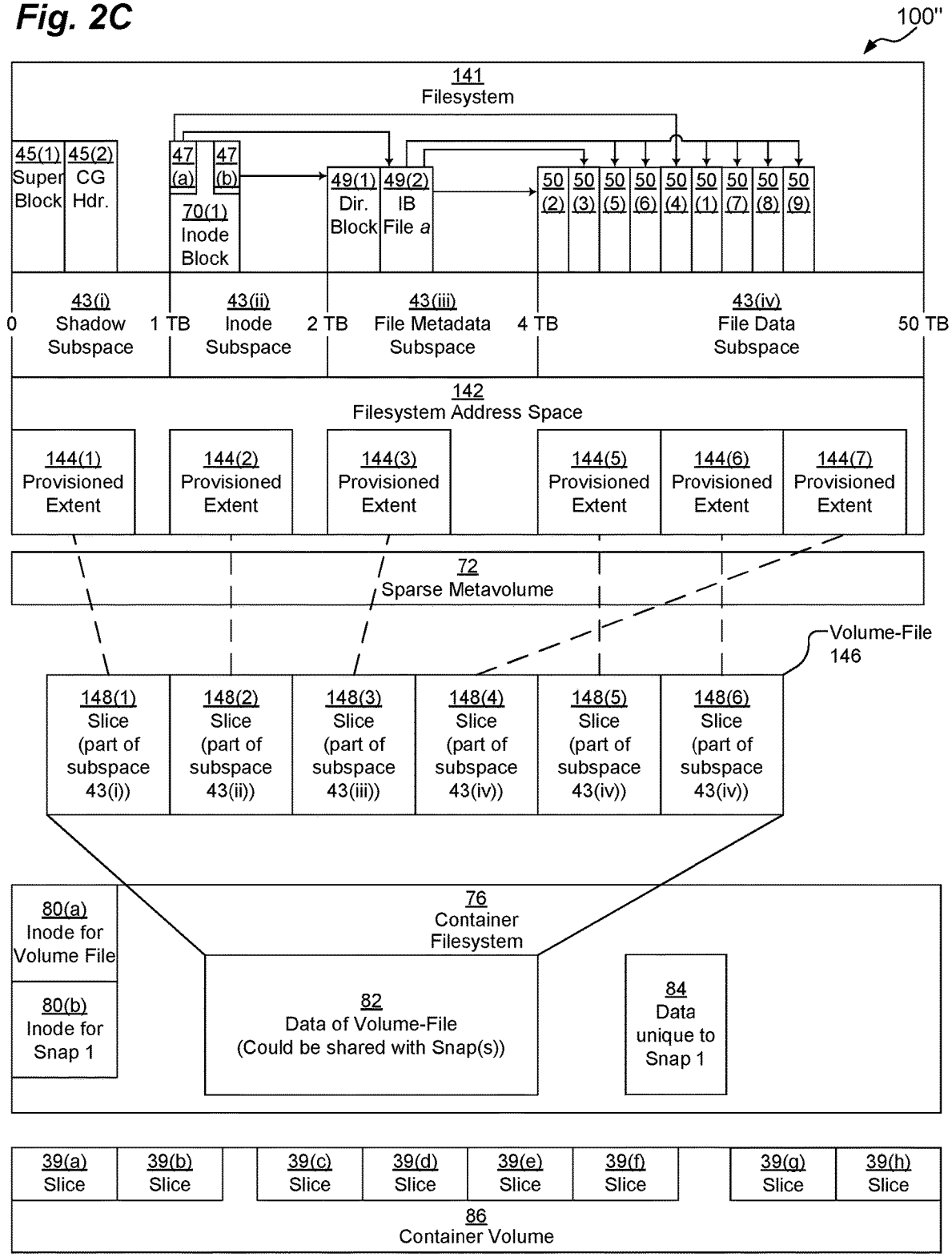

TECHNIQUES FOR REBALANCING STORAGE BETWEEN SUBSPACES

BACKGROUND

A data storage system is an arrangement of hardware and software that typically includes one or more storage processors coupled to an array of non-volatile data storage devices, such as magnetic disk drives, electronic flash drives, and/or optical drives. The storage processors service host input/output (I/O) operations received from host machines. The received I/O operations specify storage objects (e.g. logical disks or "LUNs") that are to be written to, read from, created, or deleted. The storage processors run software that manages incoming I/O operations and that performs various data processing tasks to organize and secure the host data received from the host machines and stored on the non-volatile data storage devices Some data storage systems organize data into filesystems, which are stored on respective LUNs. In example operation, users of host computing systems connect to storage processors of data storage systems, mount previously created filesystems, and proceed to read and write files of the filesystems, create new files and directories, delete files and directories, etc.

SUMMARY

Many filesystems intersperse the content of files, i.e., user data, with metadata that pertain to the user data, such as inodes, indirect blocks, directory structures, and CG (cylinder group) headers. Unfortunately, interspersing data with metadata can impair performance. For example, in some scenarios data storage systems access metadata much more frequently than they access user data to which the metadata pertains. Thus, it may be desirable to deliver a higher quality of service to metadata, which may be difficult to do when the data and metadata are interspersed. In addition, it may be desirable to organize metadata into smaller allocation units (e.g., blocks) than used for data. This can be more easily achieved when the data and metadata are segregated. Thus, some systems divide the addressable space of the filesystem into multiple subspaces, such as: a data subspace for user data; an inode subspace for inodes describing the user data; and an MDB (metadata block) subspace for indirect blocks and/or directory structures pertaining to the user data. In response to storage requests to write user files to the filesystem, the filesystem stores user data of the files in the data subspace, stores inodes pertaining to the user files in the inode subspace, and stores indirect blocks and/or directories in the MDB subspace. Segregation of data from certain metadata, and of different types of metadata from one another, promotes flexibility and provides a structural basis for many improvements in efficiency.

Unfortunately, even in systems that divide filesystems into several subspaces, inefficiencies may arise, especially due to imbalances between subspaces caused by deletion of data that alters the relative needs for different types of content within the filesystem. For example, if one or more large files that efficiently use their metadata are deleted from the filesystem, space utilization within the data subspace may dramatically decrease while space utilization within the MDB subspace may only decrease by a relatively small amount. If, later, many small files that inefficiently use their metadata are written to the filesystem, it is possible that the MDB filesystem may run out of space while a large amount of space remains unused within the data subspace. Conversely, if a large number of small files that inefficiently use their metadata are deleted from the filesystem, space utilization within the MDB subspace (and possibly the inode subspace) may decrease by a relatively larger percentage than space utilization within the data subspace. If, later, one or more large files that efficiently use their metadata are written to the filesystem, it is possible that the data filesystem may run out of space while a large amount of space remains unused within the MDB subspace (and possibly the inode subspace). Under certain conditions, these imbalances may be cured by simply increasing the size of the subspace that is too small. However, if there are no unprovisioned slices available within the filesystem and the filesystem cannot be expanded (e.g., if the filesystem is thickly-provisioned or if it has already reached a maximum size), then write operations may fail even though the filesystem has enough space because the space is allocated poorly.

Thus, it would be desirable to implement a corrective mechanism to rebalance space utilization between subspaces of a filesystem. This may be accomplished by monitoring filesystems for unbalanced allocations of storage between the subspaces and, upon detecting such imbalances, shrinking a subspace that has a surplus amount of storage so that the surplus storage may be reclaimed and reprovisioned to another subspace that needs more storage. Advantageously, a data storage system may utilize segregation of content across subspaces to obtain efficiency improvements and make full use of available storage space even after an imbalanced distribution of contents between subspaces.

In one embodiment, a method of improving storage efficiency of a data storage system is performed. The method includes (a) performing a testing operation to evaluate whether a test condition is satisfied for a filesystem hosted by the data storage system, the filesystem having a plurality of subspaces, each subspace of the filesystem being provisioned with a respective amount of storage, each subspace of the filesystem being dedicated to storing different respective types of filesystem content, wherein the test condition indicates that a first subspace of the plurality of subspaces has available space in excess of a threshold percentage, (b) in response to determining that the test condition is satisfied for the filesystem, performing a reduction operation on the first subspace to remove a portion of storage provisioned to that subspace while retaining the removed portion of storage for use by the filesystem, and (c) upon a second subspace of the plurality of subspaces reaching a fullness threshold, provisioning the removed portion of storage to the second subspace and storing content of the respective type of the second subspace thereon. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

FIG. 2C is a block diagram depicting an example I/O stack for use in conjunction with various embodiments after performing an example method according to various embodiments.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

Embodiments are directed to techniques for implementing a corrective mechanism to rebalance space utilization between subspaces of a filesystem. This may be accomplished by monitoring filesystems for unbalanced allocations of storage between the subspaces and, upon detecting such imbalances, shrinking a subspace that has a surplus amount of storage so that the surplus storage may be reclaimed and reprovisioned to another subspace that needs more storage. Advantageously, a data storage system may utilize segregation of content across subspaces to obtain efficiency improvements and make full use of available storage space even after an imbalanced distribution of contents between subspaces.

Figure 1:
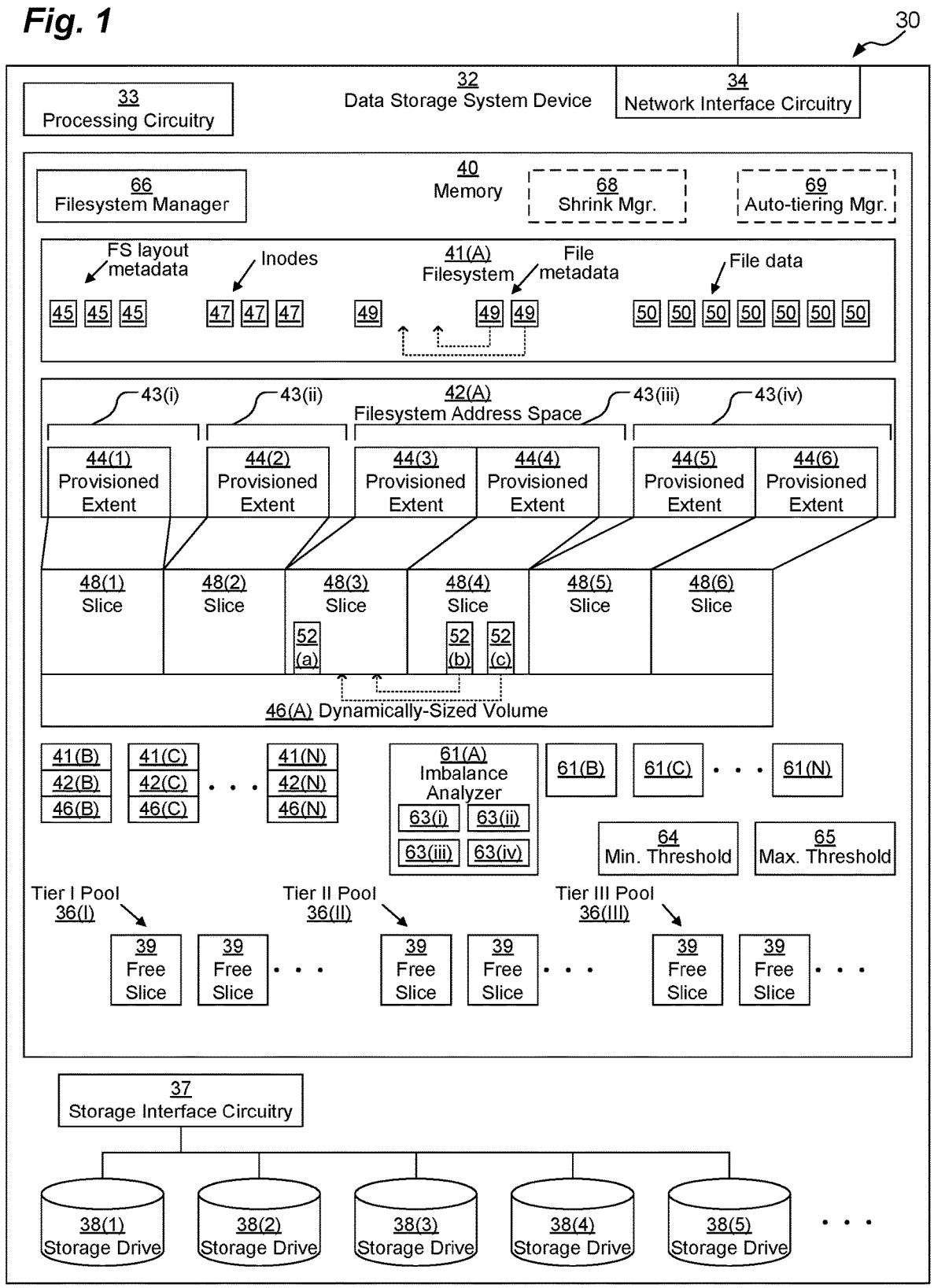
FIG. 1 is a block diagram depicting an example apparatus for use in connection with various embodiments.

FIG. 1 shows an example environment 30 in which embodiments of the improved techniques hereof can be practiced. Here, one or more host computing devices ("hosts," not depicted) access a data storage system device 32 over a network (not depicted). The data storage system 32 includes processing circuitry 33, network interface circuitry 34, storage interface circuitry 37, a set of storage drives 38 (depicted as storage drives 38(1), 38(2), 38(3), 38(4), 38(5), . . . ), and memory 40.

In an example, the storage drives 38 may be arranged into one or more RAID groups where each RAID group is composed of multiple storage drives 38. The storage drives 38 may include magnetic disk drives, electronic flash drives, optical drives, and/or other types of persistent storage. In some embodiments, storage drives 38(1), 38(2), 38(3), 38(4), and 38(5) make up a RAID group.

The network may be any type of network or combination of networks, such as a storage area network (SAN), a local area network (LAN), a wide area network (WAN), the Internet, and/or some other type of network or combination of networks, for example. The hosts may connect to the data storage system 32 using various technologies, such as Fibre Channel, iSCSI, NFS, SMB 3.0, and CIFS, for example. Any number of hosts may be provided, using any of the above protocols, some subset thereof, or other protocols besides those shown. As is known, Fibre Channel and iSCSI are block-based protocols, whereas NFS, SMB 3.0, and CIFS are file-based protocols. In an example, the data storage system 32 is configured to receive I/O requests according to both block-based and file-based protocols and to respond to such I/O requests by reading or writing to the storage drives 38. In another example, the data storage system 32 is configured to receive I/O requests only according to file-based protocols and to respond to such I/O requests by reading or writing to the storage drives 38.

Network interface circuitry 34 is configured to connect to the network. Network interface circuitry 34 may be, for example, a SCSI target adapter or network interface adapters for converting electronic and/or optical signals received over the network to electronic form for use by processing circuitry 33. The processing circuitry 33 includes one or more processing chips and/or assemblies. In a particular example, the processing circuitry 33 may include numerous multi-core CPUs. The storage interface circuitry 37 may include, for example, SCSI adapters and other disk interface adapters for communicating between the storage drives 38 and the processing circuitry 33 or memory 40.

The data storage system 32 may include multiple storage processors (not depicted). Each storage processor may include its own instance of the processing circuitry 33, network interface circuitry 34, storage interface circuitry 37, and memory 40. Multiple storage processors may be provided as circuit board assemblies, or "blades," which plug into a chassis, which encloses and cools the storage processors. The chassis has a backplane for interconnecting the storage processors, and additional connections may be made among storage processors using cables. It is understood, however, that no particular hardware configuration is required, as any number of storage processors, including a single storage processor, may be provided and the storage processor can be any type of computing device capable of processing host I/Os.

The memory 40 may include both volatile memory (e.g., random access memory, RAM), and non-volatile memory, such as one or more read-only memories (ROMs), disk drives, solid-state drives, and the like. At a minimum, memory 40 includes system memory, typically RAM. The processing circuitry 33 and the memory 40 together form control circuitry, which is constructed and arranged to carry out various methods and functions as described herein, e.g., alone or in coordination with similar control circuitry on another data storage system. Also, the memory 40 includes a variety of software constructs realized in the form of executable instructions. When the executable instructions are run by the processing circuitry 33, the processing circuitry 33 is caused to carry out the operations of the software constructs. Although certain software constructs are specifically shown and described, it is understood that the memory 40 typically includes many other software constructs, which are not shown, such as an operating system, various applications, processes, and daemons. Applications configured to run on processing circuitry 33 when stored in non-transitory form, either in the volatile portion or the non-volatile portion of memory 40 or both, form a computer program product. The processing circuitry 33 running one or more of these applications thus forms a specialized circuit constructed and arranged to carry out the various processes described herein.

As shown in FIG. 1, the memory 40 includes one or more dynamically-sized volumes 46 (depicted as dynamically-sized volumes 46(A), 46(B), 46(C), . . . , 46(N)) that supports one or more respective filesystems 41 (depicted as filesystems 41(A), 41(B), 41(C), . . . , 41(N)). Each filesystem 41 has a sparse address space 42 (depicted as filesystem address spaces 42(A), 42(B), 42(C), . . . , 42(N)) into which one or more extents 44 (depicted as provisioned extents 44(1), 44(2), 44(3), 44(4), 44(5), 44(6)) have been provisioned. Because the filesystem address spaces 42 are sparse, there are typically locations in the filesystem address spaces 42 to which no extents 44 have been provisioned.

Each provisioned extent 44 is provisioned from the respective dynamically-sized volume 46 for its respective filesystem, 41. Extents within the dynamically-sized volume 46 (or, simply, the "volume") are identified as slices 48, i.e., 48(1) through 48(6), as depicted. One should appreciate that extents 44 correspond to the same storage as respective slices 48. One may regard the volume 46 as providing a pool of slices 48. Although all slices 48 in the volume 46 are seen to be provisioned, volume 46 may include additional slices 48 that are not provisioned, but which may be available to be provisioned, for example, if the filesystem 41 were to grow.

In one example embodiment, volume 46 is provisioned with slices directly from one or more pools 36 of free slices 39. Each slice 39 is typically an equal-sized amount of storage drawn from storage drives 38. For example, if a RAID group is made up of storage drives 38(1)-38(5), then a slice 39 may be made up of several stripes across storage drives 38(1)-38(5). In some embodiments, there may be several different pools 36(I), 36(II), 36(III), etc., each respective pool 36 having slices 39 drawn from different RAID groups having different respective storage tiers (e.g., tier I made up of high-performance flash drives, tier II made up of high-performance 10,000 RPM hard drives, and tier III made up of lower-performance 5,400 RPM hard drives).

In another example embodiment, volume 46 is provided in the form of a volume-file. In an example, the volume-file is a file disposed within an internal, container filesystem (not depicted) of the data storage system 32. The container filesystem may have a construction that is similar to that of the filesystem 41, i.e., it may have its own sparse address space with its own slices drawn from a storage pool built upon one or more RAID groups.

As depicted, filesystem 41(A) has an address space 42(A) that is divided up into several different subspaces 43 (depicted as subspaces 43(i), 43(ii), 43(iii), 43(iv)). In one example embodiment, subspace 43(i) is a shadow subspace, subspace 43(ii) is an inode subspace, subspace 43(iii) is a file metadata subspace, and subspace 43(iv) is a file data subspace. Shadow subspace 43(i) may, for example, store shadow structures 45 including a super block of the filesystem 41(A), boot sectors (if the filesystem is bootable), cylinder group (CG) headers, and/or other descriptive information about layout and allocation of data blocks 50 within slices of the file data subspace 43(iv). Inode subspace 43(ii) may, for example, store inodes 47 that describe files of the filesystem 41(A). File metadata subspace 43(iii) may, for example, store metadata blocks 49 such as indirect blocks that point to data blocks 50 of the file data subspace 43(iv) and directory blocks that include listings of files within directories of the filesystem 41(A). File data subspace 43(iv) typically stores data blocks 50 as is well-known in the art. There may also be additional subspaces (not depicted, such as, for example, a virtual block map (VBM) subspace configured to store intermediate pointer structures known as VBMS that may be pointed to by inodes 47 and/or indirect blocks instead of pointing directly to data blocks 50 in order to implement features such as deduplication and compression. There may also be additional subspaces 43 as needed for any other types of filesystem content that would benefit from segregation.

Each subspace 43 is provisioned with one or more provisioned extents 44 of storage. As depicted, subspace 43(i) is provisioned with provisioned extent 44(1), subspace 43(ii) is provisioned with provisioned extent 44(2), subspace 43(iii) is provisioned with provisioned extents 44(3) and 44(4), and subspace 43(iv) is provisioned with provisioned extents 44(5) and 44(6). In one embodiment, each provisioned extent 44 could be a different size. Typically, as depicted, each provisioned extent 44 is of a fixed size and is backed by a respective slice 48 (depicted as slices 48(1), 48(2), 48(3), 48(4), 48(5), 48(6)) from the volume 46(A). In one embodiment, each slice 48 (and each provisioned extent 44) is 256 megabytes (MB). In another embodiment, each slice 48 (and each provisioned extent 44) is 1 gigabyte (GB). The size of each slice 48 may vary between embodiments, but typically, the size is at least 128 MB and no more than about 256 GB. Each slice 48 must be significantly larger than the size of a data block 50 (e.g., 4 kilobytes (KB), 8 KB, 16 KB, 64 KB, etc.). The size of a slice 48 represents the smallest granularity of storage with which subspaces 43 may be provisioned. Since the size of a slice 48 is typically the same size as the size of a slice 39 from the storage pool(s) 36 (or, the size of slices within a container filesystem, not depicted), a slice 48 also represents the smallest granularity of storage with which the filesystem 41 itself may be provisioned.

Memory 40 also stores a filesystem manager 66 and a set of imbalance analyzers 61 (depicted as imbalance analyzers 61(A), 61(B), 61(C), . . . , 61(N)). Filesystem manager 66 is configured to perform various management functions on the filesystems 41 including ensuring that all metadata is properly updated whenever a read or write operation is performed as well as resizing the filesystems 41 as needed.

As depicted, there is a separate imbalance analyzer 61 for each filesystem 41. In one embodiment, each imbalance analyzer 61 may execute in its own thread, allowing each imbalance analyzer 61 to be easily scheduled for repeat execution at a specified interval (e.g., every 2 minutes) by a system thread manager (not depicted). In another embodiment, there may be only a single imbalance analyzer 61 for all filesystems 41 or there may be several imbalance analyzers 61, each for several filesystems 41.

Each imbalance analyzer 61 may execute periodically to detect an imbalance within its respective filesystem 41. Imbalance analyzer 61 may calculate an available space percentage 63 for each of its subspaces 43. Thus, for a filesystem 41(A) having four subspaces 43(i), 43(ii), 43(iii), 43(iv), imbalance analyzer 61(A) calculates four available space percentages 63(i), 63(ii), 63(iii), 63(iv), although, in some embodiments, one or more of the subspaces 43 bay be omitted from analysis by imbalance analyzer 61. Imbalance analyzer 61(A) then compares the calculated available space percentages 63 to a minimum free space threshold 64 and a maximum free space threshold 65. In one embodiment, if it detects that at least one of the calculated available space percentages 63(x) is greater than the maximum free space threshold 65 and at least one other of the calculated available space percentages 63(y) is less than the minimum free space threshold 64, then imbalance analyzer 61(A) has detected an imbalance condition, at which point it calls on filesystem manager 66 to perform a reduction operation on the subspace 43(x). In another embodiment, instead of detecting a true imbalance condition, imbalance analyzer 61(A) instead may look for an underuse condition in which at least one of the calculated available space percentages 63(x) is greater than the maximum free space threshold 65 without checking against the minimum free space threshold 64; detection of the underuse condition also results in the imbalance analyzer 61(A) calling on filesystem manager 66 to perform a reduction operation on the subspace 43(x).

In one example, maximum free space threshold 65 is 50% and minimum free space threshold 64 is 25%. In operation as depicted (assuming, for the sake of simplicity of illustration, that each provisioned extent 44 fits up to four metadata blocks or data blocks 50), since metadata space 43(*iii*) has three metadata blocks 49 and two provisioned extents 44(3), 44(4), the calculated available space percentage 63(*iii*) is equal to 5/8=62.5%, and since data space 43(*iv*) has seven data blocks 50 and two provisioned extents 44(5), 44(6), the calculated available space percentage 63(*iv*) is equal to 1/8=12.5%. Since the calculated available space percentage 63(*iii*) of 62.5% is greater than the maximum free space threshold 65 of 50% and the calculated available space percentage 63(*iv*) of 12.5% is less than the minimum free space threshold 64 of 25%, the imbalance analyzer 61(A) detects the imbalance condition and calls on filesystem manager 66 to shrink the metadata subspace 43(*iii*). At that point, filesystem manager 66 moves all metadata blocks 49 that were in one provisioned extent 44 (as depicted from provisioned extent 44(4)) into the other provisioned extents 44 (as depicted into provisioned extent 44(3)) (resulting in data 52(*b*) and 52(*c*) within backing slice 48(4) moving to backing slice 48(3)) before removing provisioned extent 44(4) from being provisioned within metadata subspace 43(*iii*) (not depicted on FIG. 1).

It should be understood that instead of calculating available space percentages 63, imbalance analyzer 61 may equivalently calculate available space ratios or other mathematically similar values. Similarly, instead of calculating available space percentages 63 and comparing them to minimum free space threshold 64 and maximum free space threshold 65, imbalance analyzer 61 may equivalently calculate used space percentages or other similar values and instead compare them to a maximum used space threshold and a minimum used space threshold.

In some embodiments, memory 40 also stores a shrink manager 68 and/or an auto-tiering manager 69. Shrink manager 68 may be configured to periodically shrink the size of filesystems 41 that have more provisioned space than they need, freeing up space for other filesystems 41 to use. Shrink manager 68 typically runs less frequently than the various imbalance managers 61 (e.g., once every 7.5 hours instead of every 2 minutes). Shrinking of filesystems is described in U.S. patent application Ser. No. 15/282,221, entitled "EFFICIENTLY SHRINKING A DYNAMICALLY-SIZED VOLUME," which is hereby incorporated herein in its entirety by this reference.

Auto-tiering manager 69 may be configured to periodically evaluate whether the various slices 48 are backed by storage from an appropriate storage tier. In one embodiment, if a slice 48 is backed by an inappropriate storage tier, auto-tiering manager 69 may provision a new slice 39 from the appropriate storage tier, copy the original slice 48 to that new slice 39, and then deprovision the original slice 48 from the filesystem 41. In another embodiment, if the volume 46 is backed by a container file within a container filesystem, auto-tiering manager 69 may instead operate on slices of the container filesystem; auto-tiering manager 69 may also operate to move individual blocks 49, 50 within filesystem 41 to be backed by different slices within the container filesystem having an appropriate storage tier.

Figure 2A:
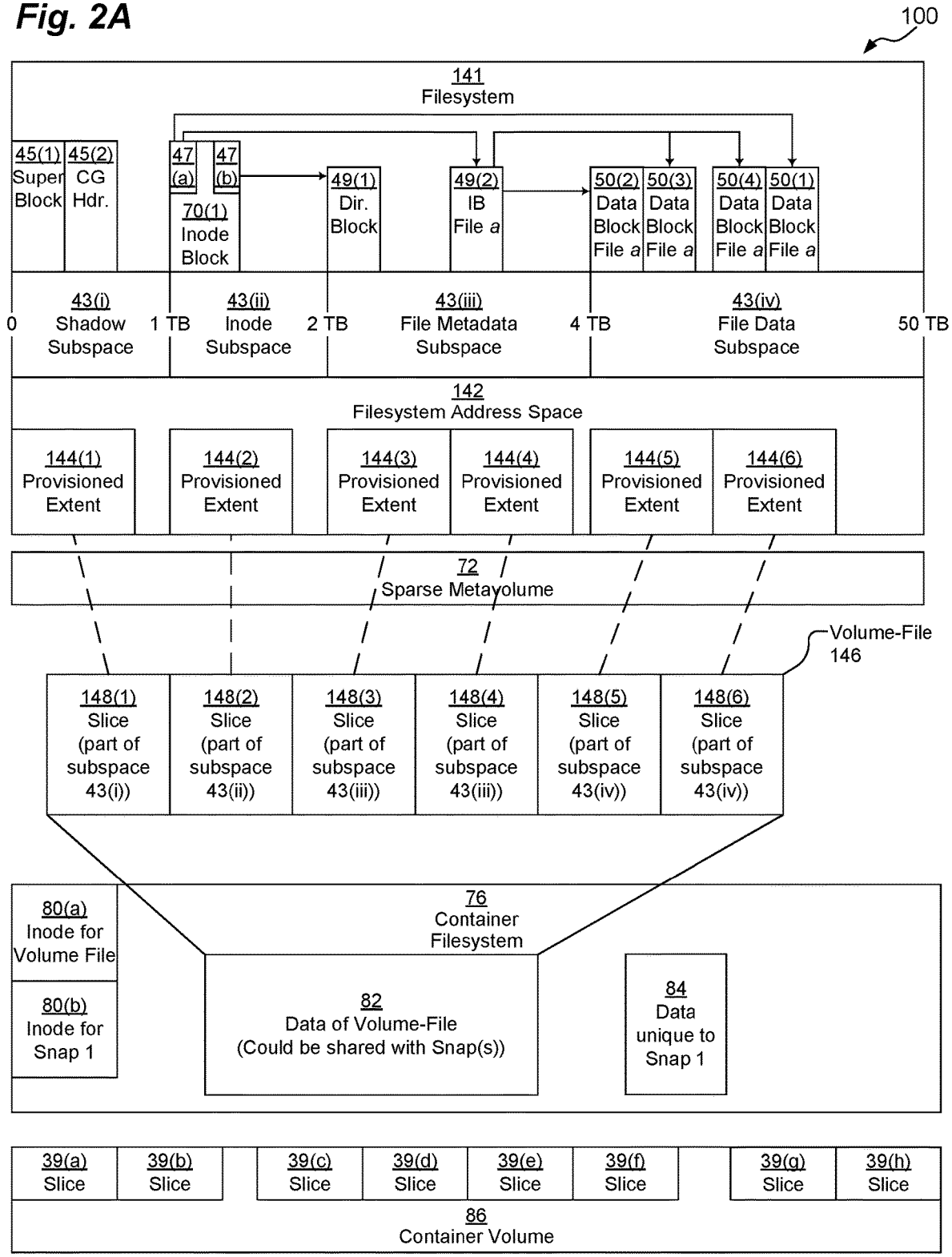
FIG. 2A is a block diagram depicting an example I/O stack for use in conjunction with various embodiments prior to and while performing an example method according to various embodiments.

FIG. 2A shows an example I/O stack arrangement 100 of a filesystem 141 backed by an example dynamically-sized volume prior to and during operation of subspace rebalancing. In this example, the dynamically-sized volume (analogous to volume 46 of FIG. 1) is realized as a volume-file 146, which is a file residing in a container filesystem 76. The container file system 76 is itself built upon a container volume 86 composed of slices 39 (i.e., 39(*a*) through 39(*h*)). The arrangement of the container file system 76 is thus analogous to that of the host-accessible file system 41 of FIG. 1. It should be understood that slices 39 of the container volume 86 are different from slices 48 of the volume file 146. Slices 39 are typically apportioned from RAID groups of the storage drives 38. Although a slice 39 is typically the same size as a slice 48, this need not be the case. In addition, slices 48 do not necessarily map one-to-one to slices 39.

As depicted, a sparse metavolume 142 is a logical mapping layer between the filesystem 141 and the volume file 146. Filesystem 141 has a sparse address space 142 to allow for convenient separation of the various subspaces 43, but sparse metavolume 142 typically has an even sparser structure. The sparse metavolume 72 allows the provisioned extents 144 within the filesystem address space 142 to be easily remapped to different underlying slices 148 of the container file 146.

Host-accessible filesystem 141, as depicted, includes two inodes 47(*a*), 47(*b*) within an inode block 70(1) as is well-known in the art. It should be understood that a typical filesystem 141 actually includes many inodes 47 and inode blocks 70(A). Each inode 47 is provided for a respective file or directory in filesystem 141. Thus, as depicted, inode 47(*a*) corresponds to file a, and inode 47(*b*) corresponds to a directory. Each inode 47 that represents a file (e.g., inode 47(*a*)) points to various data blocks 50 of the filesystem 141 as well as to indirect blocks (IBs) (e.g., IB 49(2)) that themselves point to data blocks 50 or other indirect blocks as is well-known in the art.

Host-accessible filesystem 141 may be any kind of filesystem as is known in the art, such as, for example, the Unix Filesystem; UFS 64, as available from Dell/EMC Corporation of Hopkinton, Mass.; another POSIX-compatible filesystem; NTFS defined by Microsoft Corp. of Seattle, Wash.; FAT 32; or any other filesystem.

As depicted, filesystem 141 has address space 142 ranging from 0 bytes to 50 TB (actually 50 TB minus 1 byte). As depicted, shadow subspace 43(*i*) has an address range from 0 bytes to 1 TB (actually 1 TB minus 1 byte), inode subspace 43(*ii*) has an address range from 1 TB to 2 TB (actually 2 TB minus 1 byte), file metadata subspace 43(*iii*) has an address range from 2 TB to 4 TB (actually 4 TB minus 1 byte), and file data subspace 43(*iv*) has an address range from 4 TB to 50 TB (actually 50 TB minus 1 byte).

For the sake of simplicity of illustration, each provisioned extent 144 (and similarly each slice 148) is only 256 KB in length, each provisioned extent 144 capable of storing exactly four 64-KB data blocks 50 or metadata blocks 49.

As depicted, superblock 45(1) and a CG header block 45(2) are contiguously arranged at the beginning of shadow subspace 43(*i*) at the beginning of provisioned extent 144(1). As depicted, inode block 70(1) is arranged at the beginning of inode subspace 43(*ii*) at the beginning of provisioned extent 144(2) (i.e., at an address of 1 TB). As depicted, directory block 49(1) is arranged at the beginning of file metadata subspace 43(*iii*) at the beginning of provisioned extent 144(3) (i.e., at an address of 2 TB), but then there is a gap before IB 49(2) is located at the beginning of the next provisioned extent 144(4) at address 2 TB+256 KB (provisioned extents 144(3), 144(4) being contiguously arranged). As depicted, data blocks 50(2), 50(3) are contiguously arranged at the beginning of file data subspace 43(*iv*) at the beginning of provisioned extent 144(5), but then there is a gap before data blocks 50(3), 50(1) are contiguously arranged at the beginning of the next provisioned extent 144(6) at address 4 TB+256 KB.

As depicted, inode 47(*a*) points to a data block 50(1) of file a. Inode 47(*a*) also points to IB 49(2) of file a, which, in turn points to data blocks 50(3), 50(3), 50(4) of file a. It should be understood that although inode 47(*a*) only directly points to one data block 50(1), this is by way of simplicity of illustration only; typically an inode 47 that points to an IB will also point to more than one data block 50 directly (e.g., ten, twelve, or fifteen direct block pointers as well as three or four indirect block pointers).

As depicted, inode 47(*b*) points to directory block 49(1), which defines the file or files within the directory.

As depicted in FIG. 2A, there are several unprovisioned holes within the filesystem address space 142 (e.g., between provisioned extents 144(1), 144(2), between provisioned extents 144(2), 144(3), between provisioned extents 144(4), 144(5), and after provisioned extent 144(6) until the end of the file data subspace 43(*iv*)).

Volume file 146 is composed of six contiguous slices 148 (depicted as slices 148(1), 148(2), 148(3), 148(4), 148(5), 148(6)). Slice 148(1) backs provisioned extent 144(1) and is part of subspace 43(*i*), slice 148(2) backs provisioned extent 144(2) and is part of subspace 43(*ii*), slice 148(3) backs provisioned extent 144(3) and is part of subspace 43(*ii*), slice 148(4) backs provisioned extent 144(4) and is part of subspace 43(*iii*), slice 148(5) backs provisioned extent 144 (5) and is part of subspace 43(*iv*), and slice 148(6) backs provisioned extent 144(6) and is part of subspace 43(*iv*). Volume file 146 may be thought of as providing a pool of slices 148 for use by filesystem 141; currently all slices 148 within that pool are already provisioned to specific locations within the filesystem address space 142.

Volume-file 146 is located in container filesystem 76, defined by inode 80(*a*). As depicted, the data of volume-file 146 is stored within data blocks in region 82. There may also be additional inodes 80 in filesystem 76 that define snapshots of the primary volume 146 at previous points in time. For example, inode 80(*b*) defines snap 1, pointing to data blocks within regions 82 and 84 (some blocks in region 82 may be shared).

Container filesystem 76 may also be any kind of filesystem as is known in the art, such as, for example, the Unix Filesystem; UFS 64; another POSIX-compatible filesystem; NTFS; FAT 32; or any other filesystem.

Container filesystem 76 itself rests on container volume 86, which is a volume having a sparse address space provisioned with storage slices 39 provided by the storage drives 38. As depicted, container volume 86 is provisioned with eight storage slices 39(*a*)-39(*h*). There are also unprovisioned areas located between storage slices 39(*b*) and 39(*c*) and between storage slices 39(*f*) and 39(*g*) on container volume 86.

In example operation, imbalance analyzer 61 runs on filesystem 141 and determines the available space percentage 63 of the various subspaces 43 of filesystem 141. Imbalance analyzer 61 typically ignores the shadow subspace 43(*i*) because the size of the shadow subspace is generally determined by the size of the file data subspace 43(*iv*). Imbalance analyzer 61 further determines that the available space percentage 63(*ii*) of inode subspace 43(*ii*) is ¾=75% since there is one block 70(1) out of a maximum of four on the one provisioned extent 144(2). Imbalance analyzer 61 further determines that the available space percentage 63(*iii*) of file metadata subspace 43(*iii*) is ⅝=75% since there are two blocks 49(1), 49(2) out of a maximum of eight on the two provisioned extents 144(3), 144(4). Imbalance analyzer 61 further determines that the available space percentage 63(*iv*) of file data subspace 43(*iv*) is ⅘=50% since there are four blocks 50(1), 50(2), 50(3), 50(4) out of a maximum of eight on the two provisioned extents 144(5), 144(6).

In this example, the maximum free space threshold 65 is 70% and minimum free space threshold 64 is 55%. Thus, the imbalance analyzer 61 next determines whether any of the available space percentage 63 are above the maximum free space threshold 65 of 70% or below the minimum free space threshold 64 of 55%. In this case, the imbalance analyzer 61 determines that available space percentages 63(*ii*), 63(*iii*) are above the maximum free space threshold 65 of 70% and that available space percentage 63(*iv*) is below the minimum free space threshold 64 of 55%. Because there is at least one available space percentage 63(*iii*) that exceeds the maximum free space threshold 65 and because there is also at least one available space percentage 63(*i*), 63(*iv*) that is less than the minimum free space threshold 64, the imbalance condition is triggered and imbalance analyzer 61 calls on filesystem manager 66 to perform a reduction operation on the subspace 43(*iii*) having the excessive available space percentage 63(*iii*).

Figure 2B:
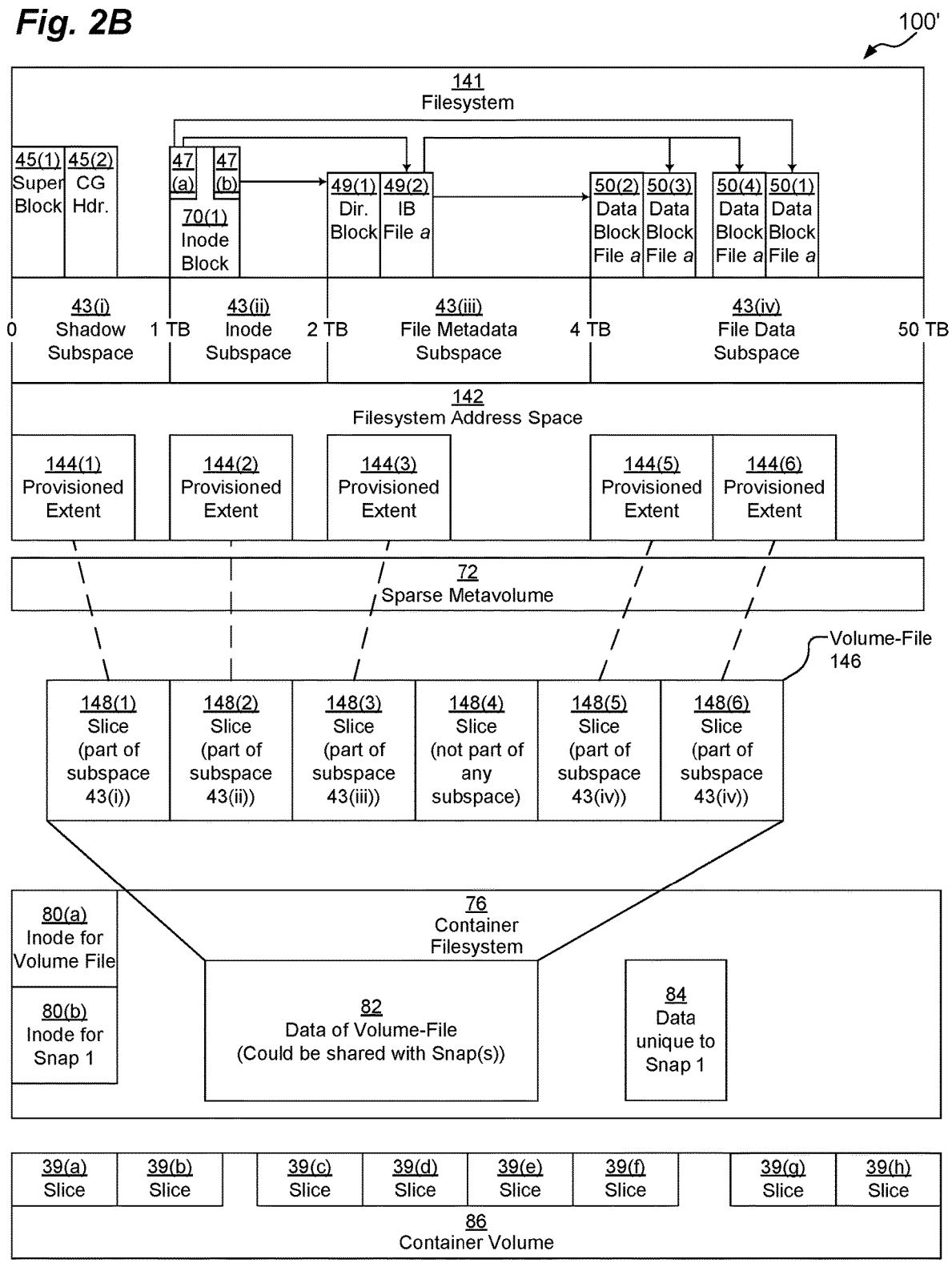
FIG. 2B is a block diagram depicting an example I/O stack for use in conjunction with various embodiments while performing an example method according to various embodiments.

FIG. 2B then shows an updated example I/O stack arrangement 100' after the filesystem manager 66 performs the reduction operation on subspace 43(*iii*). As can be seen, filesystem manager 66 has moved IB 49(2) to a different address within the filesystem address space 142 immediately after directory block 49(1) on provisioned extent 144(3). Thus, since there were no longer any blocks 49 used within provisioned extent 144(4), filesystem manager 66 has de-provisioned provisioned extent 144(4) from file metadata subspace 43(*iii*), resulting in its backing, slice 148(4) no longer being provisioned to any subspace 43 of the filesystem 141 even though slice 148(4) still remains provisioned to filesystem 141.

FIG. 2C then shows an updated example I/O stack arrangement 100" at a later point in time after more five additional data blocks 50(5), 50(6), 50(7), 50(8), 50(9) have been written to file a within the filesystem 141. Because there is space within IB 49(2) to add pointers to those data blocks 50(5)-50(9), no new metadata blocks 49 have been created. However, none data blocks 50 cannot fit on the only two provisioned extents 144(5), 144(6) that were previously provisioned to file data subspace 43(*iv*). Thus, as filesystem manager 66 processes the write operation, once the file data subspace 43(*iv*) becomes full, filesystem manager 66 attempts to provision a new extent 144 into the file data subspace 43(*iv*). Instead of needing to request additional backing store to be provisioned to the filesystem 141 from the container filesystem 76 or from a lower-level pool 36, filesystem manager 66 is able to provision slice 148(4) (which had been de-provisioned from subspace 43(*iii*) earlier) into file data subspace 43(*iv*) as new provisioned extent 144(7) making room for the last data block 50(9) to be written.

Figure 3:
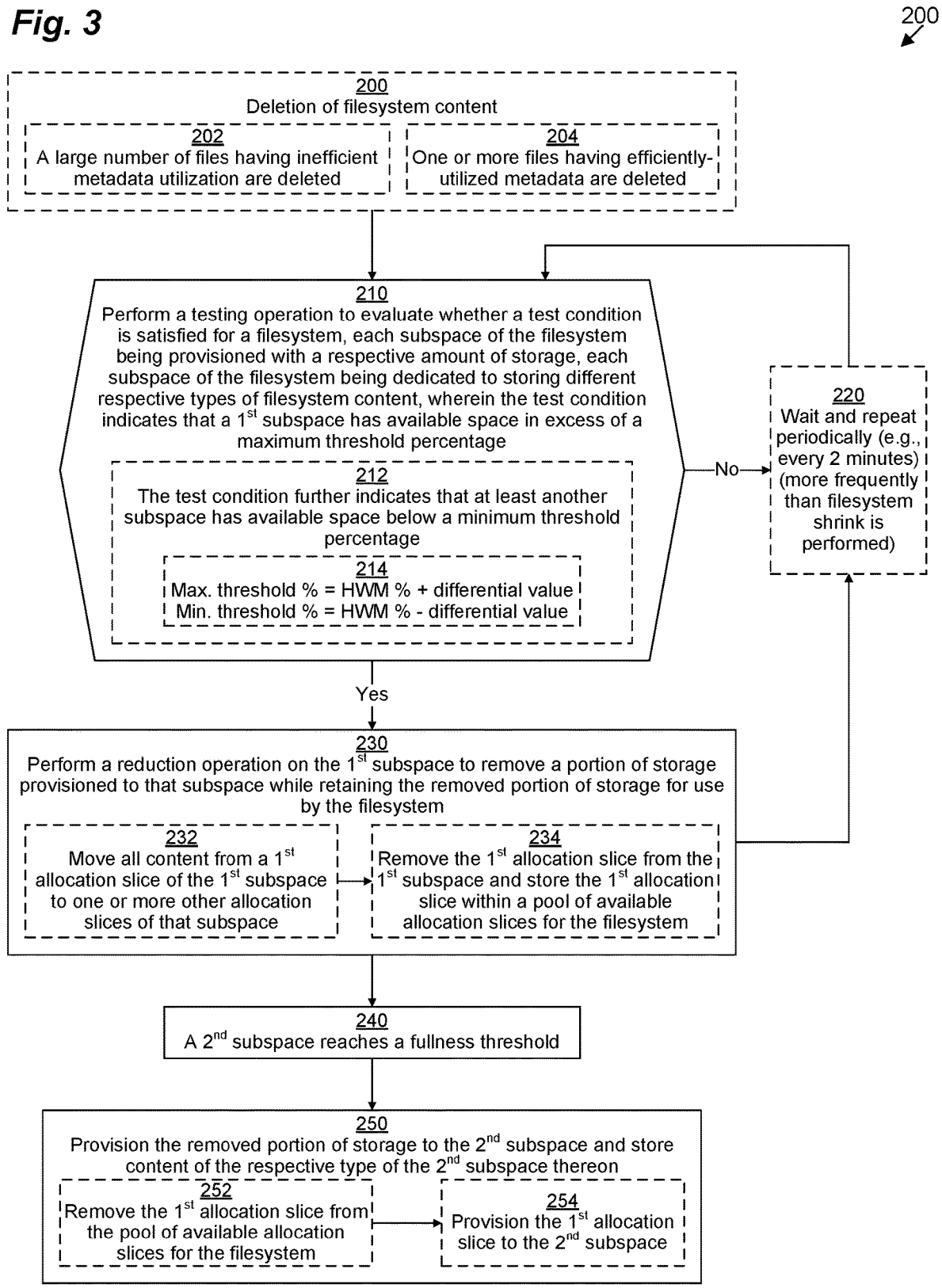
FIG. 3 is a flowchart depicting example methods of various embodiments.

FIG. 3 illustrates an example method 200 performed by a data storage system device 32 of improving storage efficiency in accordance with various embodiments. It should be understood that any time a piece of software (e.g., imbalance manager 61, filesystem manager 66, shrink manager 68, auto-tiering manager 69, etc.) is described as performing a method, process, step, or function, in actuality what is meant is that a computing device (e.g., data storage system device 32) on which that piece of software is running performs the method, process, step, or function when executing that piece of software on its processing circuitry 33. It should be understood that one or more of the steps or sub-steps of method 200 may be omitted in some embodiments. Similarly, in some embodiments, one or more steps or sub-steps may be combined together or performed in a different order. Method 200 is performed by data storage system device 32.

In step 210, which may be viewed as preliminary to (and not really part of) method 200 in some embodiments, filesystem manager 66 performs a deletion operation on a filesystem 41. For example, in sub-step 212, filesystem manager 66 deletes a large number of files having inefficient metadata utilization. A file has inefficient metadata utilization if its ratio of file metadata (i.e., IB metadata blocks 49) to file data (i.e., data blocks 50) as stored within filesystem 41 is very high (e.g., greater than 3%). For example, in some filesystems, an inode stores twelve direct pointers that point directly to data blocks 50 and three or four indirect pointers that point to IB metadata blocks 49. In some of these example filesystems, an IB metadata block 49 can store up to 1,024 pointers. If a file has fewer than twelve data blocks 50, then it will have no IB metadata blocks 49, so its ratio of file metadata to file data is 0%. If a file has exactly 1,036 data blocks 50, then it will have one IB metadata block 49 that is 100% utilized. In that case, that file's ratio of file metadata to file data is 1/1,036 or about 0.0965%. However, if a file has between twelve and 1,036 data blocks 50, its ratio of file metadata to file data will be higher than 0.0965%. Taking an extreme example, if a file has exactly thirteen data blocks 50, that file's ratio of file metadata to file data is 1/13 or about 7.692%. Since a typical filesystem uses no more than about 2% of its storage capacity for metadata on average, if filesystem 41 has a large number of inefficient files having a high ratio of file metadata to file data, that filesystem 41 may end up having a relatively large amount of storage provisioned to its file metadata subspace 43(*iii*). For example, if a filesystem 41 has 600,000 extremely inefficient files having an average ratio of file metadata to file data of 7.692% (e.g., each file has exactly thirteen data blocks 50), then, assuming a block size of eight KB (for both metadata blocks 49 and data blocks 50), the file data subspace 43(*iv*) will be at least about 59.509 GB in size and the file metadata subspace 43(*iii*) will be at least about 4.578 GB (assuming no directories). Thus, assuming a slice size of 256 MB, the file metadata subspace 43(*iii*) will be provisioned with about nineteen slices 48, while the file data subspace 43(*iv*) will be provisioned with about 239 slices 48. If suddenly 590,000 of the files are deleted, the usage of the file metadata subspace 43(*iii*) will drop to about 78.125 MB (requiring only one slice 48), while the usage of the file data subspace 43(*iv*) will drop to about 1015.625 MB (requiring only about four slices 48). Thus, before the deletion operation, the available space percentage 63(*iii*) within file metadata subspace 43(*iii*) was 3.62% while the available space percentage 63(*iv*) within file data subspace 43(*iv*) was 0.11%. After the deletion operation, the available space percentage 63(*iii*) within file metadata subspace 43(*iii*) is 98.39% while the available space percentage 63(*iv*) within file data subspace 43(*iv*) is 98.34%. This is not yet a problem. However, if subsequently a large number of files having very efficient metadata utilization are created, the available space percentage 63 will become imbalanced. Thus, if 7,700 fully efficient files each having exactly 1,036 data blocks 50 are now written to the filesystem 41, the file data subspace 43(*iv*) will need to increase to about 61.853 GB, while the file metadata subspace 43(*iii*) will only need a total of about 138.281 MB. The 138.281 MB can easily fit within the nineteen slices 48 provisioned to the file metadata subspace 48(*iii*) (in fact, it could even fit within a single slice 48), but the 61.853 GB cannot fit within the 239 slices provisioned to the file data subspace 48(*iv*), being about nine slices 48 short. Thus, filesystem manager 66 will need to increase the size of the file data subspace 48(*iv*), however, if there are no free slices 48 available within the volume 46 and if the filesystem 41 has already reached its maximum size, the filesystem 41 will not be able to store all of the data, even though the file metadata subspace 48(*iv*) is wasting eighteen slices 48.

As another example, in sub-step 212, filesystem manager 66 deletes a one or more files having efficiently-utilized metadata. For example, if a filesystem 41 has 506 extremely efficient files having an average ratio of file metadata to file data of 0.0965% (e.g., each file has exactly 1,036 data blocks 50), then, assuming a block size of eight KB as before, the file data subspace 43(*iv*) will be about 4,095.4375 MB in size and the file metadata subspace 43(*iii*) will be at least about 3.9531 MB (assuming no directories). Thus, assuming a slice size of 256 MB, the file metadata subspace 43(*iii*) will be provisioned with a single slice 48, while the file data subspace 43(*iv*) will be provisioned with sixteen slices 48. If suddenly 505 of the files are deleted, the usage of the file metadata subspace 43(*iii*) will drop to about just 8 KB (again requiring only one slice 48), while the usage of the file data subspace 43(*iv*) will drop to about 8.1 MB (requiring only one slice 48). Thus, before the deletion operation, the available space percentage 63(*iii*) within file metadata subspace 43(*iii*) was 98.46% while the available space percentage 63(*iv*) within file data subspace 43(*iv*) was 0.014%. After the deletion operation, the available space percentage 63(*iii*) within file metadata subspace 43(*iii*) is over 99.99% while the available space percentage 63(*iv*) within file data subspace 43(*iv*) is 99.8%. This is not yet a problem. However, if subsequently a large number of files having very inefficient metadata utilization are created, the available space percentage 63 will become imbalanced. Thus, if 32,767 very inefficient files each having exactly thirteen data blocks 50 are now written to the filesystem 41, the file data subspace 43(*iv*) will need to increase to about 3,335.992 MB, while the file metadata subspace 43(*iii*) will need exactly 256 MB. The 3,335.992 MB can fit within the sixteen slices 48 provisioned to the file data subspace 48(*iv*) (in fact, it could even fit within fourteen slices 48), but the 256 MB can just barely fit within the single slice 48 provisioned to the file metadata subspace 48(*iii*). At that point the available space percentage 63(*iii*) within the file metadata subspace 43(*iii*) is exactly 0%, while the available space percentage 63(*iv*) within the file data subspace 43(*iv*) is 18.55%. If even one more file is written to the filesystem 41, filesystem manager 66 will need to increase the size of the file metadata subspace 48(*iii*), however, if there are no free slices 48 available within the volume 46 and if the filesystem 41 has already reached its maximum size, the filesystem 41 will not be able to store all of the metadata, even though the file data subspace 48(*iv*) is wasting two whole slices 48 worth of space.

It should be understood that there many other scenarios that result in an imbalance of provisioned storage between the subspaces 48 that could result in problems.

In step 210, imbalance analyzer 61 performs a testing operation to evaluate whether a test condition is satisfied for a filesystem 41, each subspace 43 of the filesystem 41 being provisioned with a respective amount of storage, each subspace 43 of the filesystem 41 being dedicated to storing different respective types of filesystem content, wherein the test condition indicates that a first subspace 43(X) has available space (indicated by available space percentage 63(X)) in excess of a maximum threshold percentage 65.

In some embodiments, a separate imbalance analyzer 61 separately performs step 210 for each filesystem 41 of a set of filesystems 41 hosted by the data storage system device 32. In other embodiments, a single imbalance analyzer 61 cycles through performance of step 210 for each such filesystem 41. In yet other embodiments, several imbalance analyzers 61 are assigned to cycle through a subset of the filesystems 41. In yet other embodiments, a single imbalance analyzer 61 performs step 210 for only a single filesystem 41.

In some embodiments, the test condition is an imbalance test condition, so step 210 also includes sub-step 212 in which the test condition further indicates that at least another subspace 43(Y) has available space (indicated by available space percentage 63(Y)) below a minimum threshold percentage 64.

In some embodiments (see sub-sub-step 214), the maximum threshold percentage 65 and the minimum threshold percentage 64 are related in that a high watermark value (HWM) is used to calculate the maximum threshold percentage 65 and the minimum threshold percentage 64. The HWM may be defined to be a threshold available space percentage, which, when the available space percentage 63 for any subspace 43 drops below the HWM, the filesystem manager 66 performs an auto-extend operation to attempt to increase the total provisioned size of the filesystem 41 (e.g., by attempting to add slices 48 to the volume 46). In some embodiments, this auto-extend operation is only performed for thinly-provisioned filesystems. The maximum threshold percentage 65 may be defined as the HWM plus a stored differential value (not depicted), and the minimum threshold percentage 64 may be defined as the HWM minus the stored differential value. For example, in one embodiment, the HWM is 70% and the differential value is 10%, so the maximum threshold percentage 65 is 80% and the minimum threshold percentage 64 is 60%.

If the test condition yields an affirmative result in step 210, then operation proceeds to step 230. Otherwise, operation may proceed to step 220 (which may be viewed as tangential to method 200 in some embodiments), in which the imbalance analyzer 61 (or the particular imbalance analyzer 61) pauses for a waiting period (e.g., 2 minutes) before looping back to step 210. In some embodiments, this is accomplished by running each imbalance analyzer 61 in a separate thread and putting that thread to sleep until awakened by a scheduler module of the operating system that is configured to re-awaken the thread after a particular period of time (e.g., 2 minutes).

In step 230, in response to the affirmative test condition, the imbalance analyzer 61 calls on the filesystem manager 66 to perform a reduction operation on the first subspace 43(X) to remove a portion of storage provisioned to that subspace 43(X) while retaining the removed portion of storage for use by the filesystem 41. In some embodiments, step 230 is performed by performing sub-steps 232 and 234.

In sub-step 232, filesystem manager 66 moves all content from a first allocation slice 48(P) of the first subspace 43(X) to one or more other allocation slices 48(Q) of that subspace 43(X). Then, in step 234, filesystem manager 66 removes the first allocation slice 48(P) from the first subspace 43(X) and store the first allocation slice 48(P) within a pool of available allocation slices 48 for the filesystem 41 (e.g., within volume 46 but not apportioned to any subspace 43). This may be accomplished by means of storing an allocation map (not depicted) that indicates whether or not each slice 48 of the volume 46 is provisioned, and, if so, to which subspace 43 and or filesystem address it is provisioned.

After performance of step 230, operation may loop back to step 220 or 210 in case further subspace reduction is needed.

Also after step 230, it may happen that, in step 240, some subspace 43(Z) (sometimes the same as subspace 43(Y), but not always) reaches a fullness condition. In some embodiments, reaching the fullness condition means that subspace 43(Z) is 100% full. In another embodiment, reaching the fullness condition means the available space percentage 63(Z) for that subspace 43(Z) has dropped below a value that is less than the minimum threshold value (e.g., less than 10% or 5% available space remains). In yet another embodiment, reaching the fullness condition means the available space percentage 63(Z) for that subspace 43(Z) has dropped below the HWM.

In response to step 240, filesystem manager 66 performs step 250. In step 250, filesystem manager 66 provisions the removed portion of storage to the full subspace 43(Z) and stores content of the respective type of the full subspace 43(Z) thereon. For example, if the full subspace 43(Z) is the inode subspace 43(ii), then the filesystem manager 66 provisions new storage to the inode subspace 43(ii) and then stores inode blocks 70 on the newly-provisioned storage. As yet another example, if the full subspace 43(Z) is the file metadata subspace 43(iii), then the filesystem manager 66 provisions new storage to the file metadata subspace 43(iii) and then stores IB and/or directory metadata blocks 49 on the newly-provisioned storage. As yet another example, if the full subspace 43(Z) is the file data subspace 43(iv), then the filesystem manager 66 provisions new storage to the file data subspace 43(iv) and then stores data blocks 50 on the newly-provisioned storage.

In some embodiments (e.g., embodiments in which sub-steps 232 and 234 were performed), step 250 includes performing sub-steps 252 and 254. In sub-step 252, filesystem manager 66 removes the first allocation slice 48(P) from the pool of available allocation slices 48 for the filesystem 41 (e.g., no longer marking the first allocation slice 48(P) as being available within the allocation map). In step 254, filesystem manager 66 provisions the first allocation slice 48(P) to the full subspace 43(Z) (e.g., by indicating the new assignment within the allocation map).

Thus, techniques have been presented for implementing a corrective mechanism to rebalance space utilization between subspaces 43 of a filesystem 41. This may be accomplished by monitoring filesystems 41 for unbalanced allocations of storage between the subspaces 43 and, upon detecting such imbalances, shrinking a subspace 43(X) that has a surplus amount of storage so that the surplus storage may be reclaimed and reprovisioned to another subspace 43(Z) that needs more storage. Advantageously, a data storage system 32 may utilize segregation of content across subspaces 43 to obtain efficiency improvements and make full use of available storage space even after an imbalanced distribution of contents between subspaces 43.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

What is claimed is:

1. A method of improving storage efficiency of a data storage system, the method comprising:
    performing a testing operation to evaluate whether a test condition is satisfied for a filesystem hosted by the data storage system, the filesystem having a plurality of subspaces, each subspace of the filesystem being provisioned with a respective amount of storage, each subspace of the filesystem being dedicated to storing different respective types of filesystem content, wherein the test condition indicates that a first subspace of the plurality of subspaces has available space in excess of a threshold percentage;
    in response to determining that the test condition is satisfied for the filesystem, performing a reduction operation on the first subspace to remove a portion of storage provisioned to that subspace while retaining the removed portion of storage for use by the filesystem; and
    upon a second subspace of the plurality of subspaces reaching a fullness threshold, provisioning the removed portion of storage to the second subspace and storing content of the respective type of the second subspace thereon; wherein:
    the test condition further indicates that a third subspace of the plurality of subspaces has available space below a minimum threshold percentage, the third subspace being different than the first subspace; and
    the second subspace reaching the fullness threshold indicates that the second subspace has less than a critical amount of available storage, the critical amount of storage being less than the minimum threshold percentage.

2. The method of claim 1 wherein performing the testing operation to evaluate whether the test condition is satisfied is done periodically.

3. The method of claim 2,
    wherein the method further comprises periodically performing a filesystem shrink operation at a first frequency, the filesystem shrink operation being configured to rearrange content of the filesystem into a more compact arrangement and to return unused storage provisioned to the filesystem to no longer be provisioned to the filesystem; and
    wherein periodically performing the testing operation is performed at a second frequency, the second frequency being more frequent than the first frequency.

4. The method of claim 1 wherein performing the testing operation to evaluate whether the test condition is satisfied is done in response to a deletion of content from the filesystem.

5. The method of claim 1,
    wherein the filesystem is one of a plurality of filesystems hosted on the data storage system; and
    performing the testing operation is performed for each filesystem of the plurality of filesystems by a respective thread assigned to that filesystem.

6. The method of claim 1 wherein the filesystem is configured with an intermediate threshold percentage and a differential value, the threshold percentage being equal to the intermediate threshold percentage plus the differential value and the minimum threshold percentage being equal to the intermediate threshold percentage minus the differential value, wherein a given subspace having an available space below the intermediate threshold percentage triggers an attempt to provision the filesystem with more storage.

7. The method of claim 1 wherein the filesystem is a thickly-provisioned filesystem.

8. The method of claim 1,
    wherein the respective amount of storage provisioned to each subspace is a respective integer multiple of a size of an allocation slice, an allocation slice being a smallest unit of storage that can be provisioned to the filesystem, each allocation slice including a plurality of contiguously-arranged blocks of content;
    wherein removing the portion of storage provisioned to the first subspace includes:
        moving all content from a first allocation slice of the first subspace to one or more other allocation slices of the first subspace; and
        removing the first allocation slice from being provisioned to the first subspace and storing the first allocation slice within a pool of available allocation slices for the filesystem; and
    wherein provisioning the removed portion of storage to the second subspace includes:
        removing the first allocation slice from the pool of available allocation slices for the filesystem; and
        provisioning the first allocation slice to the second subspace.

9. The method of claim 8 wherein each allocation slice has a fixed size in the range of 128 megabytes to 256 gigabytes.

10. The method of claim 1 wherein the plurality of subspaces of the filesystem includes:
    a data subspace dedicated to storing file data; and
    a metadata subspace assigned to store indirect blocks that include pointers to blocks of file data.

11. The method of claim 10, wherein the plurality of subspaces of the filesystem further includes an inode subspace dedicated to storing inodes that define files of the filesystem.

12. The method of claim 10, wherein the plurality of subspaces of the filesystem further includes a shadow subspace assigned to store descriptive information about layout and allocation of data blocks within the data subspace.

13. A computer program product comprising a non-transitory computer-readable storage medium storing a set of instructions, which, when executed by control circuitry of a data storage system, cause the control circuitry to improve storage efficiency of the data storage system by:
performing a testing operation to evaluate whether a test condition is satisfied for a filesystem hosted by the data storage system, the filesystem having a plurality of subspaces, each subspace of the filesystem being provisioned with a respective amount of storage, each subspace of the filesystem being dedicated to storing different respective types of filesystem content, wherein the test condition indicates that a first subspace of the plurality of subspaces has available space in excess of a threshold percentage;
in response to determining that the test condition is satisfied for the filesystem, performing a reduction operation on the first subspace to remove a portion of storage provisioned to that subspace while retaining the removed portion of storage for use by the filesystem; and
upon a second subspace of the plurality of subspaces reaching a fullness threshold, provisioning the removed portion of storage to the second subspace and storing content of the respective type of the second subspace thereon;
wherein the respective amount of storage provisioned to each subspace is a respective integer multiple of a size of an allocation slice, an allocation slice being a smallest unit of storage that can be provisioned to the filesystem, each allocation slice including a plurality of contiguously-arranged blocks of content;
wherein removing the portion of storage provisioned to the first subspace includes:
moving all content from a first allocation slice of the first subspace to one or more other allocation slices of the first subspace; and
removing the first allocation slice from being provisioned to the first subspace and storing the first allocation slice within a pool of available allocation slices for the filesystem; and
wherein provisioning the removed portion of storage to the second subspace includes:
removing the first allocation slice from the pool of available allocation slices for the filesystem; and
provisioning the first allocation slice to the second subspace.

14. The computer program product of claim 13 wherein the test condition further indicates that a third subspace of the plurality of subspaces has available space below a minimum threshold percentage, the third subspace being different than the first subspace.

15. The computer program product of claim 14 wherein the filesystem is configured with an intermediate threshold percentage and a differential value, the threshold percentage being equal to the intermediate threshold percentage plus the differential value and the minimum threshold percentage being equal to the intermediate threshold percentage minus the differential value, wherein a given subspace having an available space below the intermediate threshold percentage triggers an attempt to provision the filesystem with more storage.

16. An apparatus comprising:
persistent storage devices providing data storage;
network interface circuitry configured to communicate with a host over a network; and
processing circuitry coupled to memory to form a control circuit constructed and arranged to improve storage efficiency by:
performing a testing operation to evaluate whether a test condition is satisfied for a filesystem hosted by the apparatus, the filesystem having a plurality of subspaces, each subspace of the filesystem being provisioned with a respective amount of storage, each subspace of the filesystem being dedicated to storing different respective types of filesystem content, wherein the test condition indicates that a first subspace of the plurality of subspaces has available space in excess of a threshold percentage;
in response to determining that the test condition is satisfied for the filesystem, performing a reduction operation on the first subspace to remove a portion of storage provisioned to that subspace while retaining the removed portion of storage for use by the filesystem; and
upon a second subspace of the plurality of subspaces reaching a fullness threshold, provisioning the removed portion of storage to the second subspace and storing content of the respective type of the second subspace thereon;
wherein:
the test condition further indicates that a third subspace of the plurality of subspaces has available space below a minimum threshold percentage, the third subspace being different than the first subspace; and
the filesystem is configured with an intermediate threshold percentage and a differential value, the threshold percentage being equal to the intermediate threshold percentage plus the differential value and the minimum threshold percentage being equal to the intermediate threshold percentage minus the differential value, wherein a given subspace having an available space below the intermediate threshold percentage triggers an attempt to provision the filesystem with more storage.

17. The method of claim 1 wherein the test condition indicates that the third subspace has available space below the minimum threshold percentage prior to the second subspace reaching the fullness threshold.

18. The computer program product of claim 13 wherein each allocation slice has a fixed size in the range of 128 megabytes to 256 gigabytes.

* * * * *